(12) United States Patent
Sato (10) Patent No.: US 6,337,559 B1
(45) Date of Patent: Jan. 8, 2002

(54) BATTERY PACK WITH LEAKAGE DETECTION AND CURRENT INTERRUPTING MEANS

(75) Inventor: Bunya Sato, Fukushima (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/657,547

(22) Filed: Sep. 8, 2000

(30) Foreign Application Priority Data

Sep. 10, 1999 (JP) .......................................... 11-258094

(51) Int. Cl.[7] .............................................. H01M 10/46
(52) U.S. Cl. ....................................................... 320/134
(58) Field of Search ................................. 320/134, 136, 320/147, DIG. 13; 429/90

(56) References Cited

U.S. PATENT DOCUMENTS 5,399,445 A * 3/1995 Tinker .......................... 429/90
6,106,969 A * 8/2000 Lian et al. .................... 429/90

* cited by examiner

Primary Examiner—Edward H. Tso
(74) Attorney, Agent, or Firm—Ronald P. Kananen; Rader, Fishman & Grauer PLLC (57) ABSTRACT

In a battery cell or a battery pack, employing the battery cell, it is necessary to stop the malfunction of the battery cell or the battery pack due to leakage of an electrolyte solution from progressing to prevent occurrence of an accident such as ignition or fuming. To this end, a battery pack includes a battery cell 3, a leakage detection unit 4 for detecting the leakage of an electrolyte solution of the battery cell 3, a current breaker 5 for electrically interrupting a current line between the battery cell and external terminals 9 on occurrence of leakage of the electrolyte solution in the battery cell 3, and a discharging device 6 having the function of self-discharging the battery cell 3. The battery pack is connected to a main equipment body unit X or to a charger Y to effect discharging or charging, respectively.

5 Claims, 8 Drawing Sheets

BATTERY PACK WITH LEAKAGE DETECTION AND CURRENT INTERRUPTING MEANS

BACKGROUND OF THE INVENTION

1. Field of the Invention

This invention relates to a battery pack having one or more battery cells enclosed therein. More particularly, it relates to a battery pack in which, on occurrence of liquid leakage in an internal battery cell, such liquid leakage is detected to prohibit the progression of malfunctions caused by such liquid leakage.

2. Description of Related Art

The battery pack, used as a driving power source for a portable electrical equipment, such as a personal computer, portable telephone or a video camera, referred to below simply as a main equipment, includes one or more battery cells and a control circuit, in its inside, these battery cells and the control circuit being interconnected by a complex interconnection.

In these battery packs, leakage of the electrolyte solution, sealed in the battery cell, is likely to occur if a shock is applied from outside to the battery pack due to descent or collision, if the exterior of the battery cell is rusted due to moisture intruded into the inside of the battery pack, or if the junction of the exterior in the vicinity of the positive electrode of the battery cell is deteriorated or punched. If such leakage of the electrolyte solution occurs in one of the battery cells in the battery pack, the electrolyte solution flows into and is spread in the inside of the battery pack to become attached to the interconnection or to a substrate of the control circuit. In the battery pack, the electrolyte solution tends to become attached to the interconnection or to a substrate of the control circuit and, after lapse of a certain time interval, metals such as copper, iron, aluminum or nickel of the interconnection or the substrate are dissolved into the electrolyte solution. In such case, the resistance of the portion to which the electrolyte solution has attached is lowered to form a new electrically conductive line of a certain resistance value. The resistance of the portions to which the electrolyte solution has attached may, for example, be on the order of 1 to 10. There are occasions where the electrically conductive line produced by leakage of the electrolyte solution is connected to both the positive and negative electrodes.

If the above-mentioned electrically conductive line has interconnected the positive and negative electrodes of the battery cell, the voltage of the battery cell is applied to the electrically conductive line so that the current flows therein to evolve heat to raise the cell temperature. For example, if the voltage of the battery cell is 4V and the resistance of the electrically conductive is 1 $\Omega$, the current of 1 A flows in the electrically conductive line to evolve the heat of 4W. If, in the battery pack, the temperature of the electrically conductive line is raised gradually to reach 200 C or higher, accidents due to leakage of the electrolyte solution, such as fuming or firing, occur in the electrically conductive line.

Moreover, the heat of the electrically conductive line is transmitted to the battery cell arranged in its vicinity, such that the risk of fuming or firing occurs even in the battery cell the terminals of which are not interconnected by electrically conductive line. For example, if the heat evolved in the electrically conductive line is transmitted such that the temperature in the battery cell exceeds 130 C, the synthetic resin separator isolating the positive and negative electrodes from each other in the battery cell is dissolved to short the positive and negative electrodes to cause internal shorting to evolve heat and conseqent fuming or firing thus leading to accidents ascribable to leakage.

With the conventional battery pack, there are lacking sufficient countermeasures against occurrence of accidents ascribable to the above-described leakage of electrolyte solutions. Thus, in a certain conventional battery pack, insulating paper sheets capable of absorbing the electrolyte solution are placed about the battery cell to absorb the electrolyte solution to prevent an electrically conductive line from being formed on occurrence of leakage. In another conventional battery pack, metallic portions of the interconnection or the substrate are coated with an adhesive or a synthetic resin to prevent the metal from being dissolved in the electrolyte solution to prevent an electrically conductive line from being formed on occurrence of leakage.

However, if the insulating paper sheet is used, it is difficult to absorb the leaked electrolyte solution completely. On the other hand, if the metal portions are coated with e.g., an adhesive, such a phenomenon occurs in which the adhesive is first dissolved in the electrolyte solution before the metal portions are dissolved.

In addition, if, in the interior of the battery pack, leakage of the electrolyte solution has occurred, a user can hardly recognize the unusual occurrence, such that there is a risk of charging/discharging being repeated as the leaked state is not remedied. If the charging/discharging is repeated after the occurrence of the leakage of the electrolyte solution, the battery pack tends to fall into disorder, that is the leakage of the electrolyte solution and the dissolution of metal are allowed to progress, so that a dangerous state is apt to be produced.

SUMMARY OF THE INVENTION

It is therefore an object of the present invention to provide a battery pack in which, if leakage of the electrolyte solution occurs in the battery pack, the progress of the trouble of the battery cell or the battery pack due to the leakage of the electrolyte solution is prohibited to prevent occurrence of accidents.

In accordance with the present invention, there is provided a battery pack including a battery cell, leakage detection means for detecting the leakage of an electrolyte solution of the battery cell, current breaking means for electrically interrupting the current line between the battery cell and external terminals on occurrence of leakage of the electrolyte solution in the battery cell and discharging means having the function of self-discharging the battery cell.

In the above-described battery pack according to the present invention, if leakage occurs in an internal battery cell, it is detected by leakage detection means, and the current line between the battery cell and the external terminals is electrically interrupted by the current breaking means, so that the battery cell is self-discharged by discharging means until the voltage of the battery cell is reduced to zero. That is, should leakage occur, the electronic energy in the battery pack ultimately becomes equal to zero. So, in the present battery pack, charging/discharging is disabled on occurrence of leakage of the electrolyte solution to stop the progress of the malfunctions ascribable to such leakage to prevent accidents, such as heating, fuming or ignition from occurrence.

That is, in the battery pack according to the present invention, there is provided a function of disconnecting the connection line between the external tenminals and the battery cell on detection of leakage of the electrolyte solution, so that the battery pack in the unusual state is necessarily unusable to prevent the accident due to the leakage from progressing to prevent unusual heating and accidents of ignition or fuming ascribable to such heating.

DESCRIPTION OF THE PREFERRED EMBODIMENTS

Figure 1:
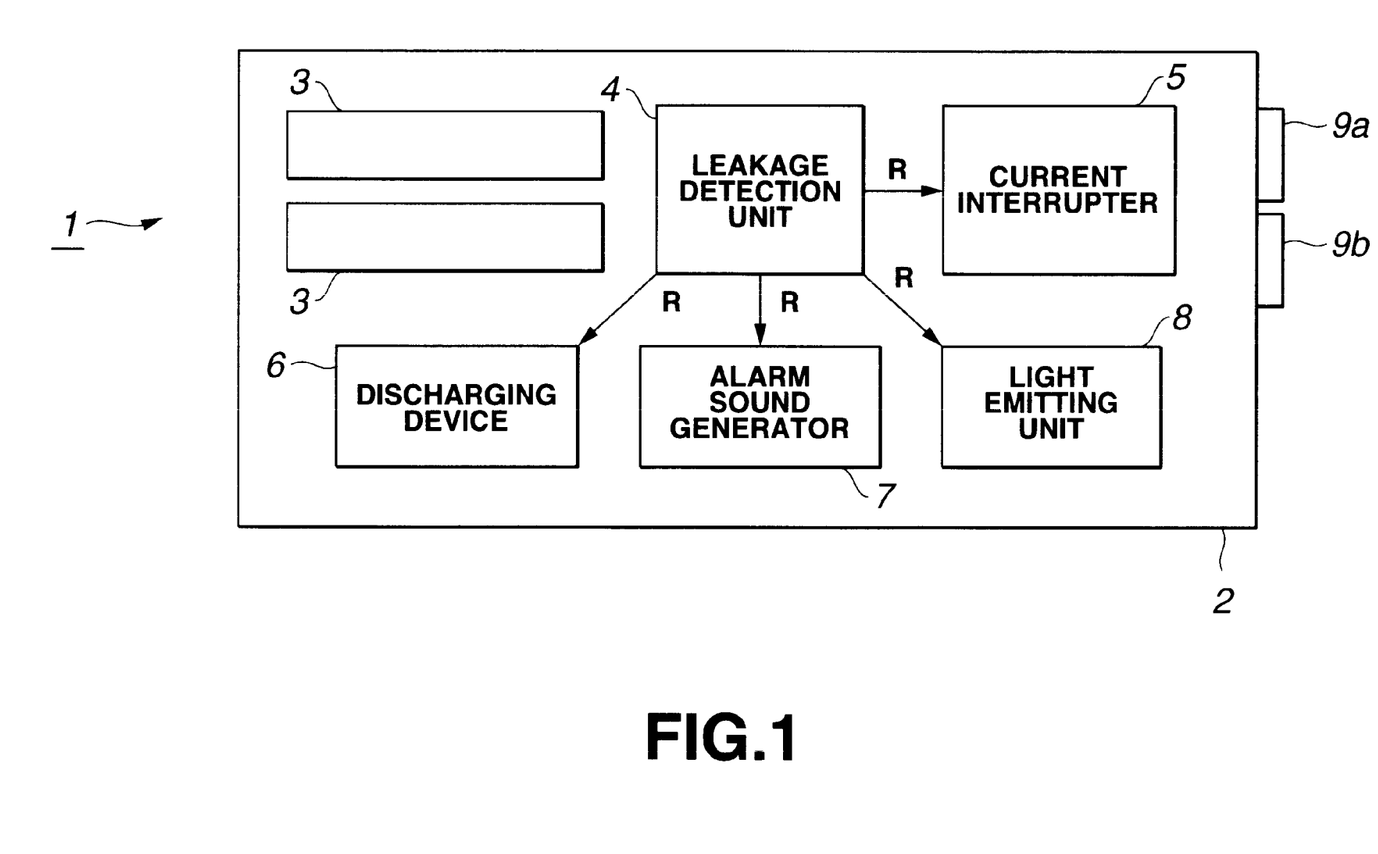
FIG. 1 illustrates a schematic structure of a battery pack.
Figure 2:
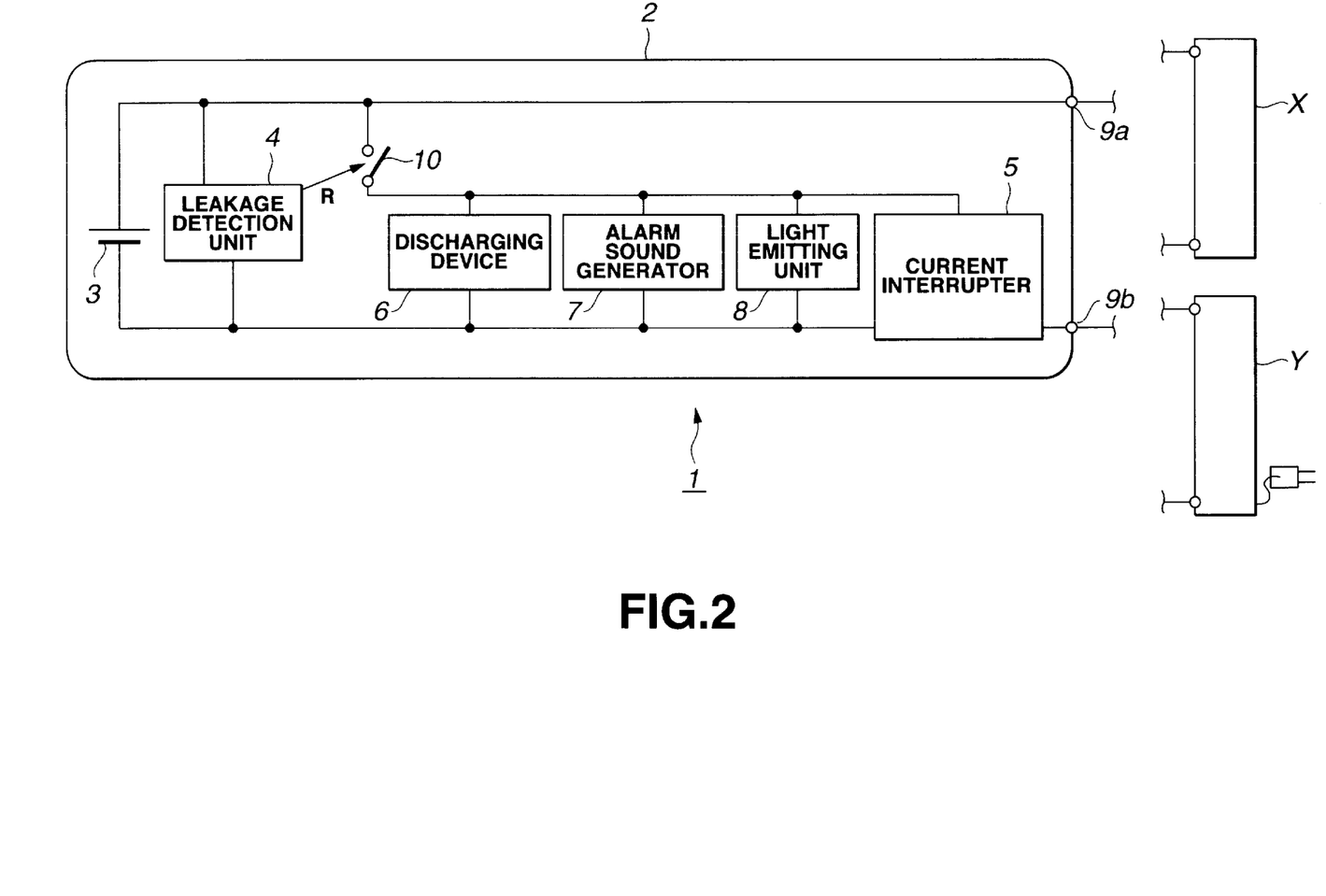
FIG. 2 is a block diagram showing a schematic structure of a battery pack.

Referring to the drawings, preferred embodiments of a battery pack according to the present invention will be explained in detail. A battery pack 1 according to the present invention includes one or more battery cells 3, for example, two battery cells 3, a leakage detection unit 4, a current breaker 5, a discharging device 6, an alarm sound generating device 7 and a light emitting device 8, within an external casing 2, as shown in FIG. 1. The battery pack 1 is provided with external tenminals 9 (an positive electrode terminal 9a and a negative electrode terminal 9b ), by means of which the battery pack 1 is connected to a main equipment body unit X, and a charger Y, both lying outside the external casing 2, as shown in FIGS. 1 and 2. The main equipment body unit X has the battery pack 1 as a driving power source, whilst the charger Y is used for charging the battery pack 1. The external terminals 9 are electrically connected to the battery cell 3 provided in the external casing 2.

The battery cell 3 used is a lithium ion secondary cell, only by way of an example. Thus, secondary batteries, such as a nickel-cadmium cell, a nickel-hydrogen cell, a lithium ion cell, a lithium polymer cell or a lead cell, or primary batteries, such as a manganese battery, an alkali battery or a lithium battery, may also be used.

Figure 3:
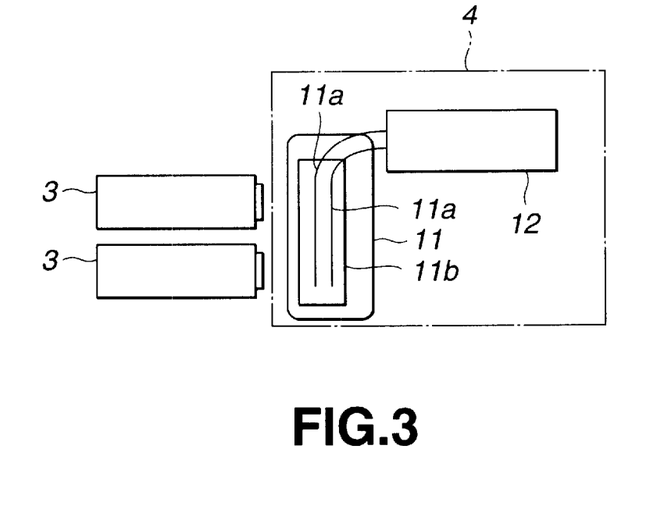
FIG. 3 illustrates a schematic structure of a leakage detector.

The leakage detection unit 4 has the function of detecting possible leakage occurring in the battery cell 3 accommodated in the battery pack 1. The leakage detection unit 4 includes a leakage detector 11 and a leakage verification unit 12, as shown in FIG. 3.

The leakage detector 11 is provided with an electrically conductive metal line 11a and an insulating member 11b. The electrically conductive metal line 11a is of a pattern of two parallel interconnection lines electrically insulated from each other by the insulating member 11b. In the leakage detector 11, should liquid leakage occur in the battery cell 3, such that the electrolyte solution is affixed across the two lines of the electrically conductive metal line 11a, the electrical resistance across the lines of the electrically conductive metal line 11a is lowered.

One or more leakage detectors 11 are provided in the battery pack 1. Meanwhile, the leakage detector 11 is arranged in the vicinity of the positive electrode of each battery cell 3 because the leakage is most likely to occur in the area in the vicinity of the positive electrode of each battery cell 3.

Figure 4A:
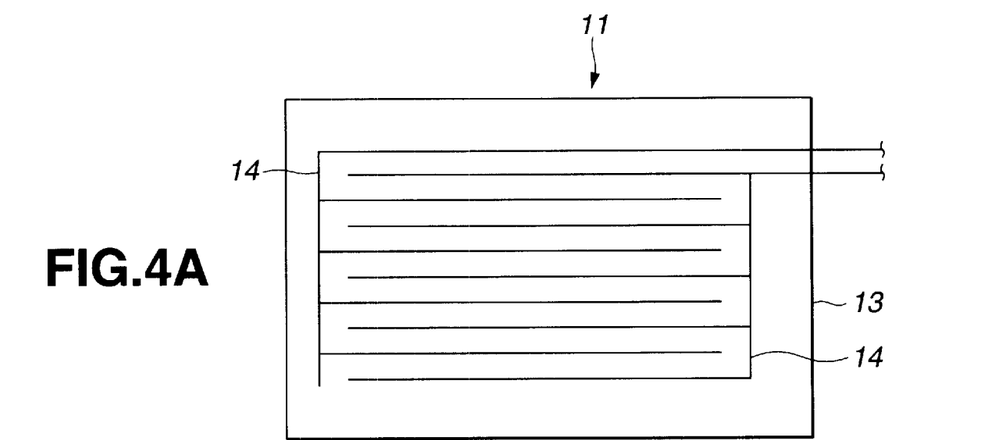
FIGS. 4a and 4b illustrate the structure of the leakage detector, FIG. 4a being a plan view of a leakage detection unit and FIG. 4b being a longitudinal cross-sectional view showing a modification of the leakage detector.

The leakage detector 11 is comprised of a pair of copper foil patterns 14, in the form of comb teeth each 20 mm long, formed on an insulating printed circuit board 13, these copper foil patterns 14 being arranged parallel and in a staggered relation to each other, with an interval of 1 mm therebetween. In the leakage detector 11, the copper foil patterns 14 are connected to each other by the electrolyte solution which has leaked and has become deposited thereon, so that the resistance value between the copper foil patterns 14 is decreased to complete an electrically conductive current line. If voltage not lower than approximately 1V is continuously applied across the copper foil patterns 14, migration occurs on deposition of the electrolyte solution across the copper foil patterns 14, thus shorting an area lying between the copper foil patterns 14. In the leakage detector 11, an insulating sheet, not shown, may be bonded to each of the printed circuit board 13 and to the copper foil patterns 14 formed thereon. If the insulating sheets are bonded in this manner to the printed circuit board 13 and to the copper foil patterns 14, it is possible to provide for a wider leakage detection site to enable leakage detection over a wider area. The insulating sheet may be prepared of a combustion-retardant paper sheet exhibiting insulation and hygroscopic properties.

Figure 4B:
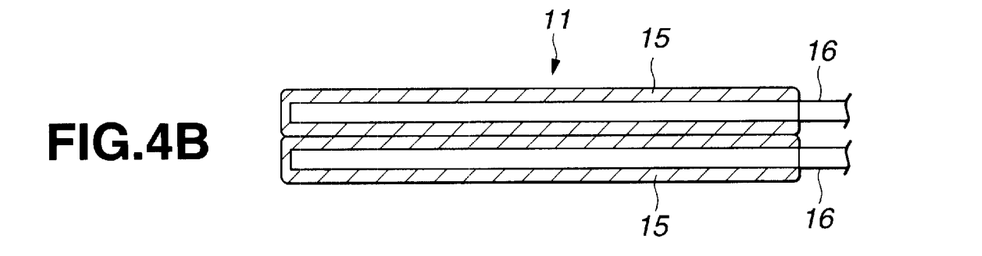

The leakage detector 11 is comprised of two polymer tubes 15 sheathing copper wires 16, 16 affixed to each other such as by fusion, as shown in FIG. 4b. The tubes 15 are formed of a material capable of absorbing the electrolyte solution, such as resin or polymer. The leakage detector 11 is constructed so that the tubes are rendered hygroscopic by having numerous pores to permit electrical conduction across the copper lines 16 by penneation of the deposited electrolyte solution on leakage, and so that, in the absence of deposited or penneated electrolyte solution, the tubes 15 act for insulating the space between the two copper lines 16. That is, the leakage detector 11 is constructed so that the electrolyte solution deposited thereon is penneated into the tubes 15 to provide for electrically conduction between the two copper lines 16 to lower the resistance of the area confined between the copper lines to establish an electrically conductive electrical current path.

To the leakage verification unit 12 are connected one ends of the two electrically conductive metal lines 11a of the leakage detector 11, as shown in FIG.3. The leakage verification unit 12 measures the resistance value across the electrically conductive metal lines 11a and compares the so-measured resistance value to a pre-set reference value to verify whether or not the leakage has occurred. Since the resistance value in the leakage detector 11 on occurrence of the leakage of the electrolyte solution and deposition thereof in the leakage detector 11 is less than 100 kΩ, the leakage verification unit 12 sets a reference value of the resistance across the two electrically conductive metal lines 11a to 100 kΩ, and verifies the occurrence of the leakage when the resistance value is less than 100 kΩ. When the leakage verification unit 12 has verified that leakage has occurred in the battery cell 3, the unit 12 issues a leakage detection signal R. This leakage detection signal R is reflected in the operations of the current breaker 5, discharging device 6, alarm sound generating device 7 and the light emitting device 8, as will be explained in detail subsequently.

Figure 5A:
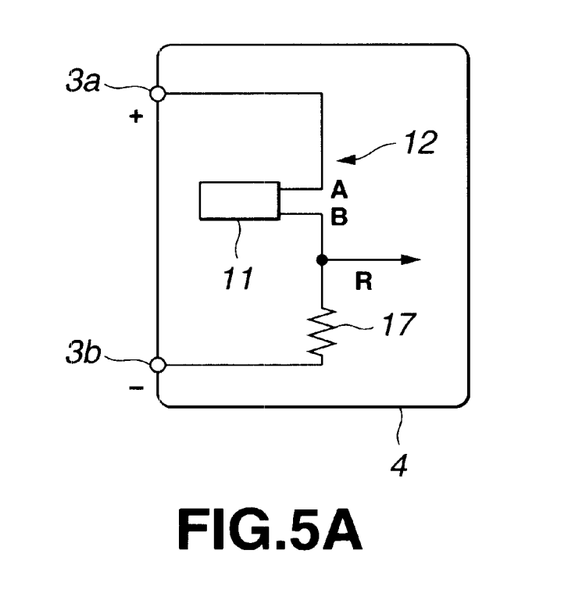
FIG. 5a is a circuit diagram showing a structure of a leakage detector and FIG. 5b is a circuit diagram showing another structure of a leakage detector.

In the above-described leakage verification unit 12, an end of one of the electrically conductive metal lines 11a of the leakage detector 11 is connected to a point A, connected in turn to the positive electrode 3a of the battery cell 3, whilst an end of the other electrically conductive metal line 11a is connected to a point B, connected in turn to a negative electrode 3b of the battery cell 3 through a resistor 17a of approximately 100 kΩ, as shown for example in FIG. 5a. When the voltage of the point B, to which is connected the end of the other metal line 11a, is not lower than one-half the voltage of the battery cell 3, such as not lower than approximately 2V, which is one-half the voltage of 4V of the battery cell 3, the leakage verification unit 12 verifies that the leakage has occurred, and accordingly outputs a leakage detection signal R.

Figure 5B:
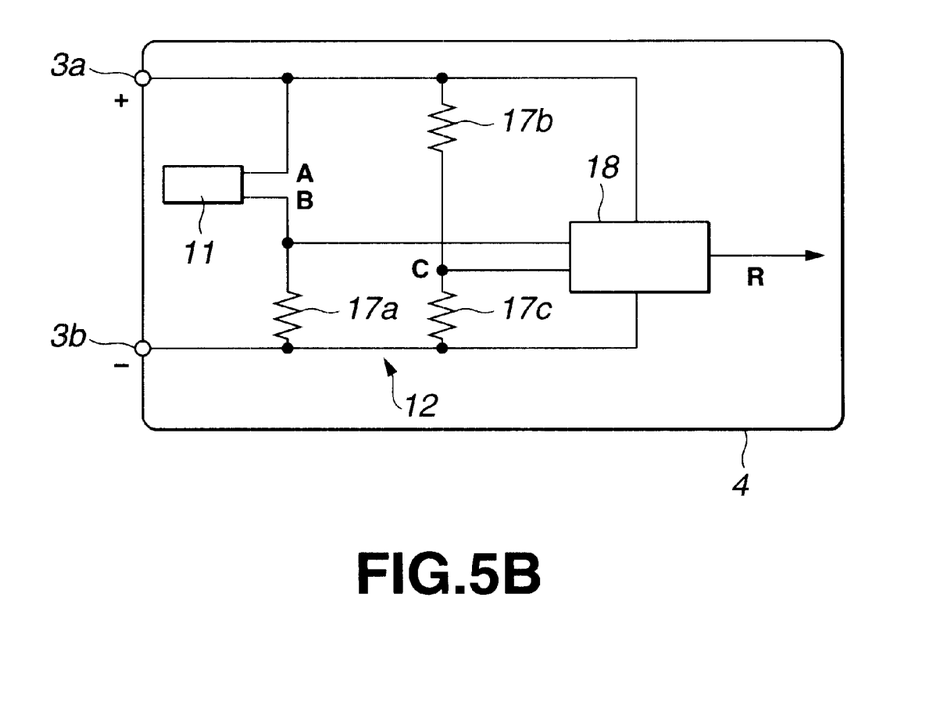

In the leakage verification unit 12, one end of the electrically conductive metal line 11a is connected to the point A, connected in turn to the positive electrode 3a of the battery cell 3, and the end of the other electrically conductive metal line 11a is connected to the negative electrode 3b of the battery cell 3 through a resistor 17a (100 kΩ), while a voltage comparator 18 is connected to the battery cell 3, as shown in FIG. 5b. In this leakage verification unit 12, the voltage at the point B is inputted as a detection voltage input to the voltage comparator 18, whilst two serially connected resistors 17b, 17c are connected in parallel across the positive electrode 3a and the negative electrode 3b of the battery cell 3, with the voltage at a point C, as a median point of the two resistors 17b, 17c, being inputted as a reference voltage input to the voltage comparator 18. The resistance values of the resistors 17b, 17c are equal to each other, with the voltage at the point C as a reference voltage input point being one-half the voltage of the battery cell 3. When the voltage detection input at the voltage comparator 18 is not less than the voltage value of the reference input voltage, the leakage verification unit 12 verifies that the leakage has occurred, and outputs the leakage detection signal R.

Meanwhile, the leakage detection signal R in the leakage verification unit 12 of the leakage detection unit 4 may be outputted to each of the current breaker 5, discharging device 6, alarm sound generating device 7 and to the light emitting device 8. The leakage detection signal R may also be outputted to a switch 10 which controls the connecting state to the battery cell 3 of the current breaker 5, discharging device 6, alarm sound generating device 7 and the light emitting device 8, as shown in FIG. 2. The switch 10 has its contact switched from the released state to the connected state by the leakage detection signal R outputted by the leakage detection unit 4. As the switch 10, a latching type electro-magnetic relay or a single stable type electro-magnetic relay is used.

The current breaker 5 plays the function of electrically disconnecting the battery cell 3, suffering the leakage, form the external terminals 9. The current breaker 5 breaks the current line for charging and discharging between the battery cell 3 and the external terminals 9 by the leakage detection signal R outputted by the leakage verification unit 12 of the leakage detection unit 4. As the current breaker 5, an SC protector having a temperature fuse and a heater, a field-effect transistor, or a transistor may be used.

Figure 6A:
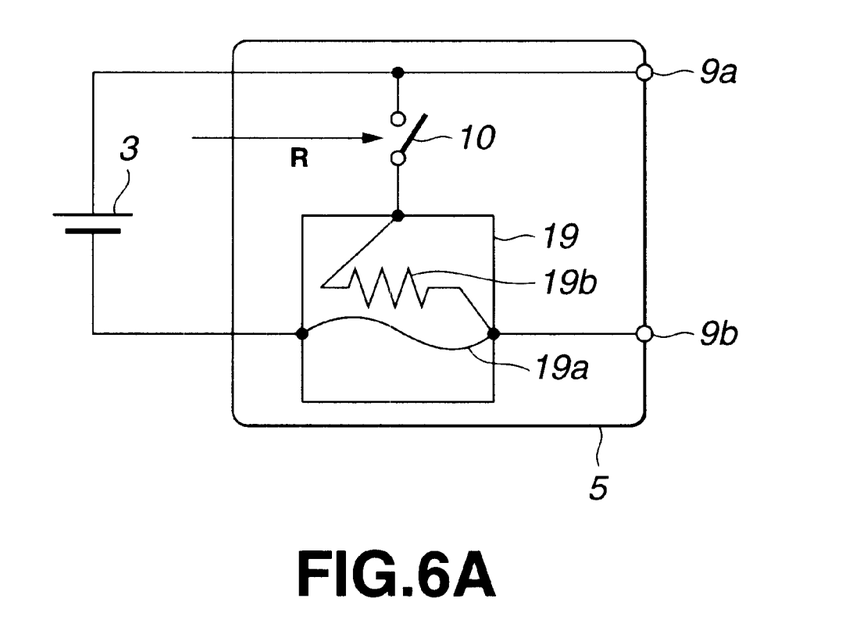
FIG. 6a is a circuit diagram showing a structure of a current breaker and FIG. 6b is a circuit diagram showing another structure of a current breaker.

In the current breaker 5, a fuse provided with a heater 19 is connected through the switch 10 to the battery cell 3, as shown in FIG. 6a. The fuse provided with a heater 19 is provided with a temperature fuse 19a, completing a current line between the battery cell 3 and the external terminal 9b, and with a heater resistance 19b connected to the battery cell 3 through the switch 10. In the current breaker 5, if the switch 10 is closed by the leakage detection signal R from the leakage detection unit 4, the voltage of the battery cell 3 is applied to the heater resistance 19b of the fuse provided with a heater 19. In the current breaker 5, the heater resistance 19b, to which is applied the voltage of the battery cell 3, evolves heat which melts the temperature fuse 19a interconnecting the battery cell 3 mounted near-by and the external terminal 9b.

Figure 6B:
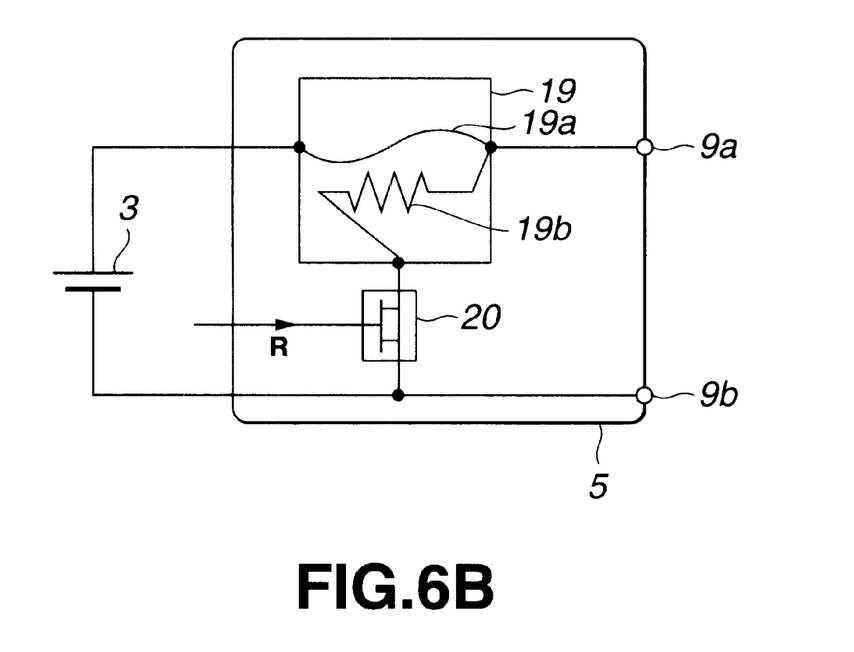

The current breaker 5, shown in FIG. 6b, includes a field-effect transistor 20, in place of the switch 10 shown in FIG. 6b. The fuse provided with a heater 19 is connected through this field-effect transistor 20 to the battery cell 3. As the field-effect transistor 20, a N-channel field-effect transistor, for example, is used. In this current breaker 5, the gate-to-source voltage of the field-effect transistor 20 is approximately 4V, by the leakage detection signal R from the leakage detection unit 4, with the drain-to-source resistance becoming sufficiently low. In the current breaker 5, the voltage of approximately 4V of the battery cell 3 is applied to the heater resistance 19b of the fuse provided with a heater 19, thus heating the heater resistance 19b. In the current breaker 5, the temperature fuse 19a, interconnecting the battery cell 3 mounted near-by and the external terminal 9a, is broken under the heat generated by the heater resistance 19b.

The discharging device 6 plays the role of self-discharging the battery cell 3 in which the leakage has occurred. By the leakage detection signal, outputted by the leakage detection unit 4, a resistor, a temperature detecting posister or a polyswitch (PTC) is connected to the battery cell 3 to cause self-discharge of the battery cell 3 until its voltage is reduced to 0V. At this time, the resistor of the discharging device 6 is set to a resistance value which will give a sufficiently small discharge current value in order to prevent the temperature of the battery pack 1 from increasing excessively on self-discharging. In the discharging device 6, the resistance value of the resistor connected to the battery cell 3 and the resistance value of the temperature detecting posister are set to 1 kΩ and to 470 Ω, respectively. For example, the PTC has the function of limiting the current value so that the self-temperature will be not higher than approximately 120° C., and hence there is no possibility of the temperature becoming excessively high. Therefore, the PTC is set to a resistance value of 100 kΩ. In the discharging device 6, temperature rise in the battery pack 1 undergoing self-discharging at the resistor etc is not higher than approximately 5° C., which is a sufficiently safe temperature with no risk of ignition.

Figure 7A:
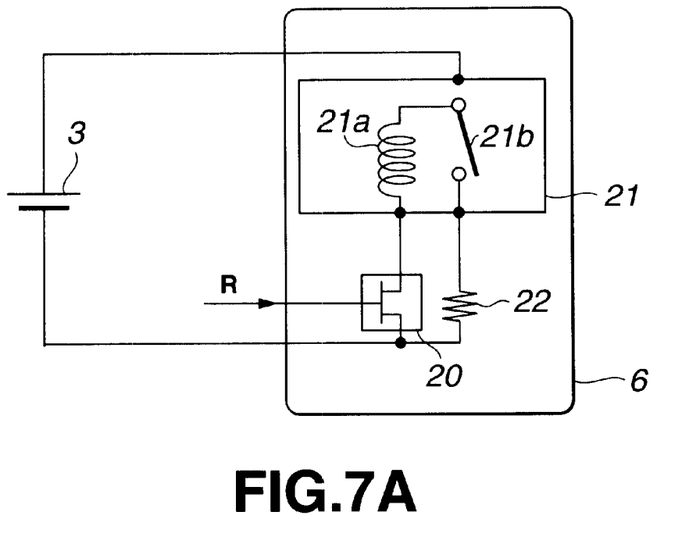
FIG. 7a is a circuit diagram showing a structure of a discharging device.

In the discharging device 6, a resistor 22 is connected via an electro-magnetic relay 21 to the battery cell 3, whilst a field effect transistor 20 is connected via the electro-magnetic relay 21 to the battery cell 3. The electro-magnetic relay 21 is a non-restoration type switching element comprised of a set coil 21a and a contact output 21b. In the discharging device 6, if, on reception of the leakage detection signal R from the leakage detection unit 4, the drain-to-source resistance of the field effect transistor 20 becomes sufficiently small, the battery cell voltage is applied to the set coil 21a, and the contact output 21b of the electro-magnetic relay 21 is switched to the connected state, the current of the battery cell 3 flows to the resistor 22 by way of discharging.

Figure 7B:
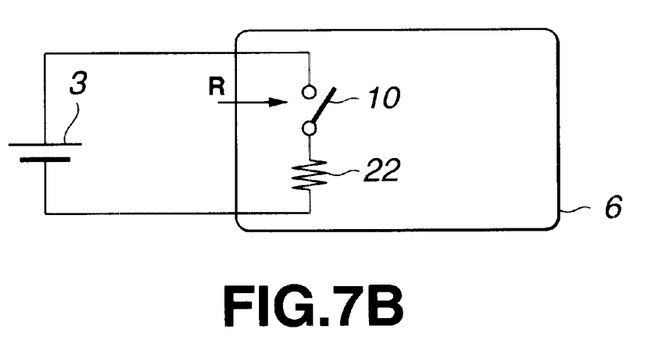
FIG. 7b is a circuit diagram showing another structure of a discharging device and FIG. 7c is a circuit diagram showing yet another structure of a discharging device
Figure 7C:
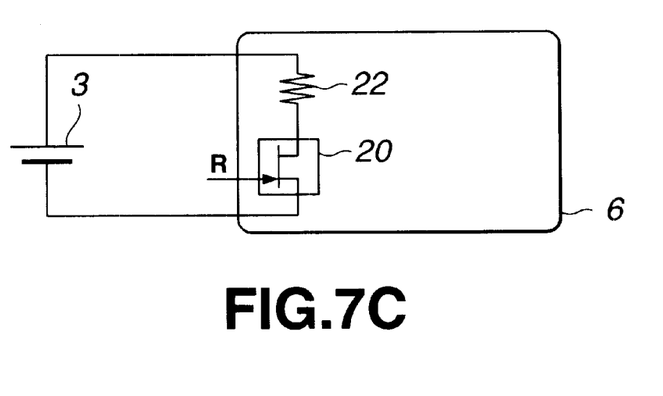

In the discharging device 6, a switch 10, shown in FIG. 7b, or a field effect transistor 10, shown in FIG. 7c, may also be used in place of the electro-magnetic relay 21 controlling the state of connection across the resistor 22 and the battery cell 3.

Directly after occurrence of leakage, the discharging device 6 starts to be discharged by a resistor. After lapse of a certain time, the voltage of the battery cell 3 is 0V to complete the discharging.

The alarm sound generating device 7 and the light emitting device 8 operate as alarming means for a user of the battery pack 1, and perform the role of communicating the fact of leakage to outside. Similarly to the current breaker 5 and the discharging device 6, the alarm sound generating device 7 and the light emitting device 8 are connected in series with the battery cell 3 via switch 10. The alarm sound generating device 7 issues an alarm tone by the leakage detection signal from the leakage detection unit 4 to communicate the fact of leakage to outside, specifically to a user of the battery pack 1 by the alarm sound. The light emitting device 8 lights a lamp etc by the leakage detection signal from the leakage detection unit 4 to communicate the fact of leakage to outside, specifically to a user of the battery pack 1 by light. Preferably, a display which reads: "if the alarm sound is issued, the battery pack is malfinctioning, so please stop using the battery pack" is provided on a caution label of the battery pack 1 by way of prompting the user to discontinue the use of the battery pack.

Figure 8:
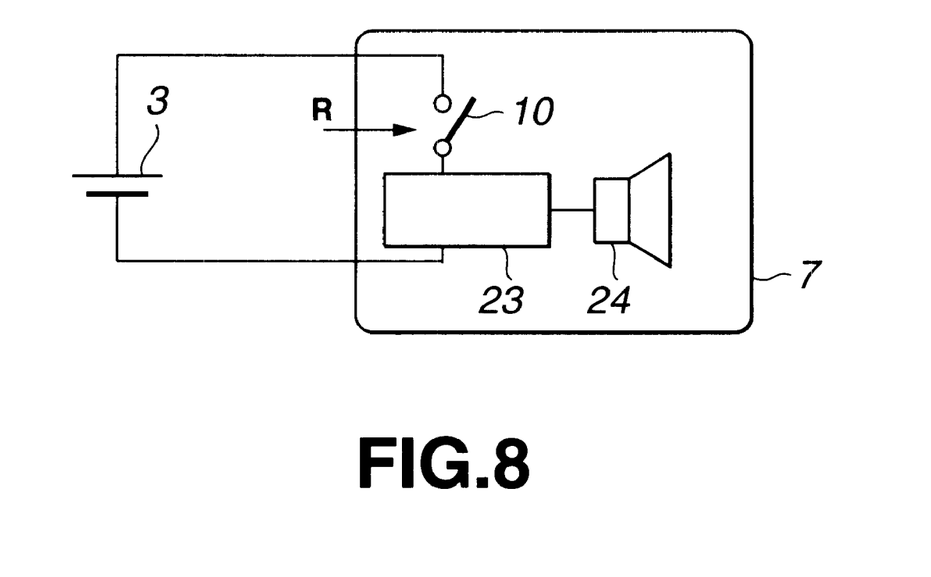
FIG. 8 is a circuit diagram showing a structure of an alarm sound generating device.
Figure 9:
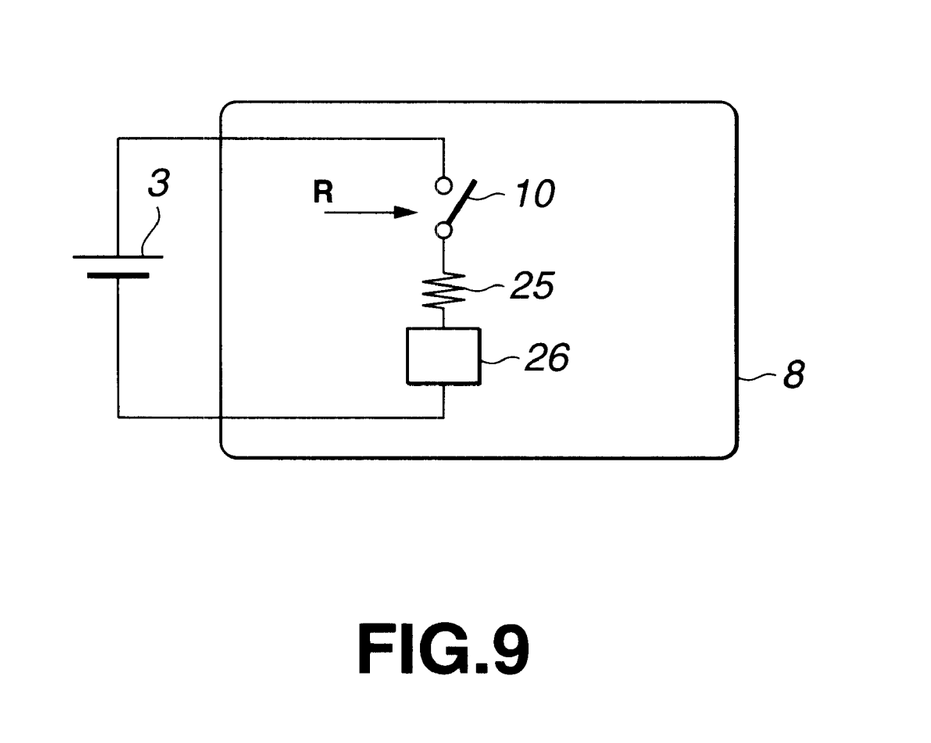
FIG. 9 is a circuit diagram showing a structure of a light emitting device.

In the alarm sound generating device 7, an alarm sound generator 23 and a speaker 24 are connected to the battery cell 3 through a switch 10, as shown for example in FIG. 8. In the light emitting device 8, a resistor 25 and a light emitting diode 26 are connected through the switch 10 to the battery cell 3, as shown for example in FIG. 9.

The battery pack 1 detects the leakage occurring in the battery cell 3 by the above-mentioned leakage detection unit 4. In addition, the battery cell 3 suffering the leakage is electrically disconnected from outside to render the charging/discharging impossible to stop the progress of the malfunctioning caused by leakage to prohibit occurrence of accidents such as ignition or fuming.

In the battery pack 1, since discharging occurs in the discharging device 6, directly after occurrence of leakage, until the voltage of the battery cell 3 is zero, no current flows through the electrically conductive line produced due to the leaking electrolyte solution, thus prohibiting unusual heating and occurrence of accidents such as ignition or fuming ascribable to such heating.

Moreover, in the battery pack 1, since the occurrence of unusual states is communicated to a user by the alarm sound from the alarm sound generating device 7 or light emitted by the light emitting device 8, the user is able to recognize the unusual state in the battery pack to take proper steps such as stopping using the battery pack to prohibit unusual heating and occurrence of accidents such as ignition or fuming ascribable to such heating.

Referring first to FIG. 2, the operation of the battery pack 1, constructed as described above, is explained in detail.

If, in the battery pack 1, no leakage of the electrolyte solution is occurring in the battery cell 3, no leakage of the electrolyte solution is detected by the leakage detection unit 4, so that the leakage detection signal R is not outputted to the switch 10. Therefore, the switch 10 in the battery pack 1 is kept in its off state, so that none of the current breaker 5, discharging device 6, alarm sound generating device 7 and the light emitting device 8 is connected to the battery cell 3 and hence is not in operation. That is, the battery pack 1 is maintained in a state of charging or discharging the battery cell 2 enclosed in the battery pack 1.

If conversely the leakage of the electrolyte solution has occurred in the battery cell 3 inside the battery pack 1, such leakage of the electrolyte solution is detected by the leakage detection unit 4, so that the leakage detection signal R is outputted to the switch 10. In the battery pack 1, the switch 10 is switched from its off state to its on state, by this leakage detection signal R, so that the current breaker 5, discharging device 6, alarm sound generating device 7 and the light emitting device 8 are connected to the battery cell 3 to perform the following operations:

That is, the current breaker 5 interrupts the current line across the battery cell 3 and the external terminal 9b to disable the charging or discharging of the battery pack 1. On the other hand, the discharging device 6 discharges the battery cell 3 until the voltage of the battery cell 3 is 0V. The alarm sound generating device 7 also advises the unusual state of the battery cell 3 in the battery pack 1, specifically, the occurrence of leakage, by issuing an alarm sound, such as by a buzzer. Moreover, the light emitting device 8 issues the light that can be recognized from outside, such as light from a lamp, thus advising the user ofthe occurrence of leakage of the electrolyte solution in the battery cell 3 in the battery pack 1.

Figure 10:
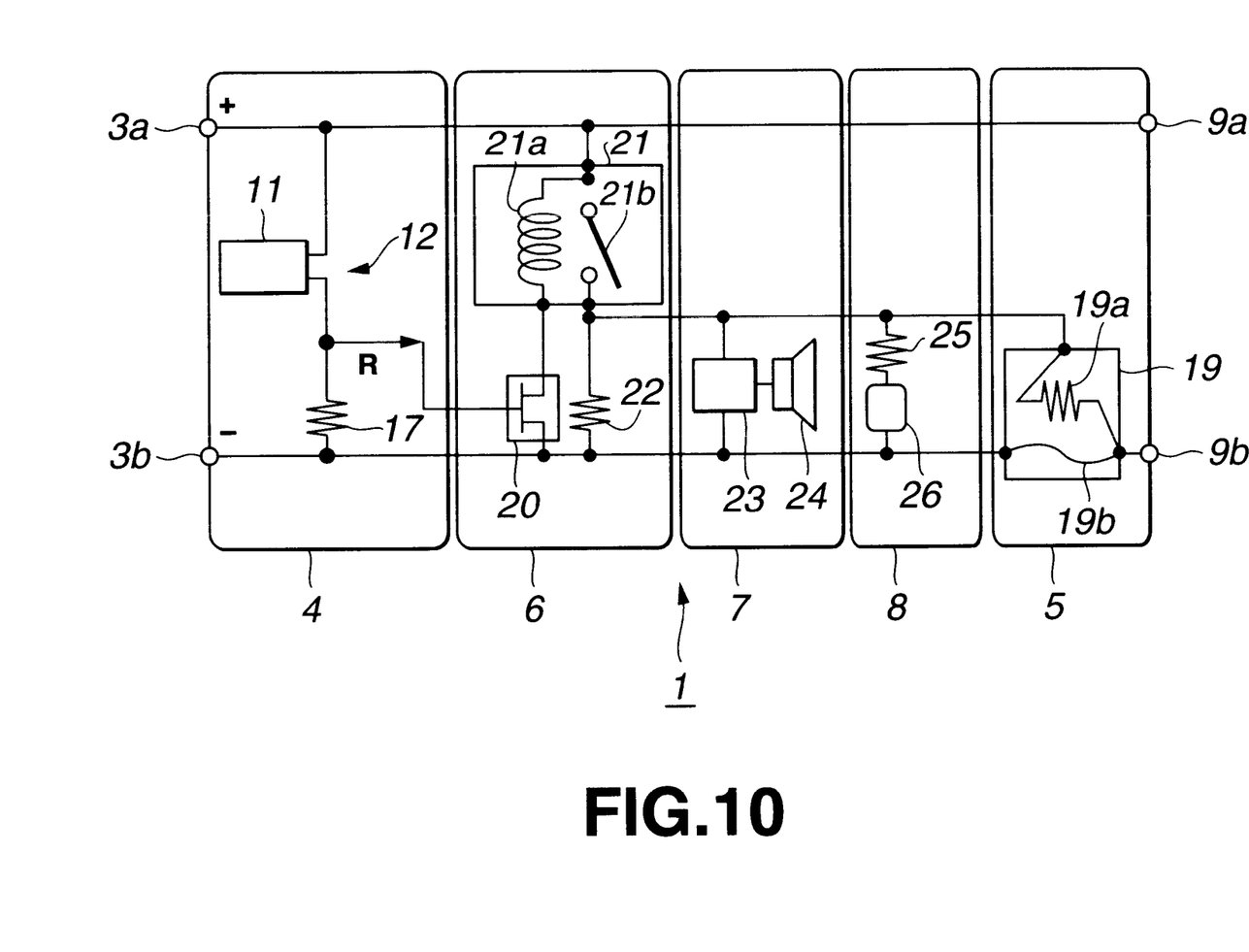
FIG. 10 is a circuit diagram showing a specified structure of a battery pack.

The specified operation of the above-described battery pack 1 is now explained with reference to FIG. 10. Meanwhile, the battery pack 1, shown in FIG. 10, is made up of the leakage detection unit 4, current breaker 5, discharging device 6, alarm sound generating device 7 and the light emitting device 8, shown in FIGS. 5a, 6a, 7a, 8 and 9, respectively.

If, in the battery pack 1, no leakage of the electrolyte solution is occurring in the battery cell 3, the resistance across the electrically conductive metal lines 11a is not less than 10 MΩ, with the voltage at a point B being 0V, such that the leakage detection signal R is not issued. At this time, the gate voltage of the field effect transistor 20 is 0V, with the resistance across the source and the drain of the field effect transistor 20 being not less than approximately 1 MΩ. Therefore, no current flows through the set coil 21a of the electro-magnetic relay 21, and hence the contact output 21b of the electro-magnetic relay 21 is kept in its off state, so that none of the current breaker 5, discharging device 6, alarm sound generating device 7 and the light emitting device 8 is connected to the battery cell 3. So, none of these components is in operation.

If conversely the leakage of the electrolyte solution has occurred in the battery cell 3, the resistance value across the electrically conductive metal lines 11a is as low as approximately 100 kΩ or less, as a result of deposition of the electrolyte solution, so that a leakage detection signal R is issued. The magnitude of the output leakage detection signal R is not less than approximately 2V when the voltage at the point B is not less than one-half the voltage of the battery cell 3, for example, when the voltage of the battery cell 3 is approximately 4V. At this time, the gate voltage of the field effect transistor 20 is not less than approximately 2V, with the source-to-drain voltage of the field effect transistor 20 being 0 Ω. At this time, approximately 4V is applied to the set coil 21a of the electro-magnetic relay 21 of the battery pack 1, such that the contact output 21b is switched from the off state to the on state to connect the current breaker 5, discharging device 6, alarm sound generating device 7 and the light emitting device 8 to the battery cell 3 to perform the following operations:

That is, in the current breaker 5, the voltage of approximately 4V of the battery cell 3 is applied to the heater resistor 19a of the fuse provided with a heater 19. If the resistance value of the heater resistor 19a is approximately 4 Ω and the fusing temperature of the temperature fuse 19b is approximately 230° C., the voltage of approximately 4V of the battery cell 3 is applied to the heater resistor 19a. The current of approximately 1 A flows through the heater resistor 19a to evolve the heat of approximately 4 W. By this heating of the heater resistor 19a, the temperature fuse 19b is heated. When the temperature of the temperature fuse 19b is not lower than approximately 230 ° C., the temperature fuse 19b is fused. When the temperature fuse 19b is fused, the current line between the battery cell 3 and the external terminals 9, specifically, the current line between the negative electrode 3b of the battery cell 3 and the external terninal 9b, that is between the negative electrode 3b of the battery cell 3 and the external terminal 9b of the negative electrode, is interrupted to disable the charging from the charger Y and the discharging to the main equipment body unit X.

If the leakage detection signal R is outputted, the gate voltage of the field effect transistor 20 is approximately not lower than approximately 2V, with its drain-to-source resistance being 0Ω. At this time, the voltage of approximately 4V is applied to the set coil 21a to switch the contact output 21b from the off state to the on-state. With the contact output 21b switched to the on state, the voltage is applied to the resistor 22, so that the current of approximately 4 mA flows through the resistor 22. The current of approximately 4 mA continues to flow through the resistor 22 until the voltage of the battery cell is equal to 0 V, to effect discharging. For example, if the voltage of the battery cell 3 is 800 mAH, the voltage of the battery cell 3 is 0 V after discharging for approximately 200 hours, with the battery pack 1 then being in a safe state, that is, the electrical energy in the battery pack 1 is reduced to zero.

When the voltage is applied to the alarm sound generating device 7, the latter issues an alarm sound signal at a speaker to advise the user of the occurrence of an unusual state. In the light emitting device 8, the voltage of approximately 4V is applied to the resistor and to the LED. If the resistance value of the resistor is 100 Ω, approximately 2V is applied to the resistor, with the voltage of 2V being applied to the LED through which flows the current. The LED emits light, since the current of 20 mA flows therein, to advise the user of the occurrence of troubles.

Although the battery pack 1 is provided with the current breaker 5, discharging device 6, alarm sound generating device 7, and the light emitting device 8, the present invention is not limited to this merely illustrative configuration. It is only sufficient if, in the battery pack 1, the leakage of the battery cell 3 is detected and, if such leakage occurs, the electrical connection across the battery cell 3 and the external terminals 9 is interrupted by the leakage detection unit 4 and the current breaker 5.

In the above-described battery pack 1, leakage in the battery cell 3 is detected by changes in the resistance value of the leakage detector 11. However, the arrangement may also be made so that heating of the battery cell 3 is monitored, a leakage detection signal R is issued on detection of unusual heating to electrically interrupt the current line between the battery cell 3 and the external terminals 9 to effect self-discharging of the discharging device 6.

What is claimed is:

1. A battery pack connected to a main equipment body unit or to a charger to effect charging or discharging, said battery pack comprising:

a battery cell;

leakage detection means for detecting the leakage of an electrolyte solution of said battery cell; and current breaking means for electrically interrupting a current line between said battery cell and external terminals on occurrence of leakage of the electrolyte solution in said battery cell.

2. The battery pack according to claim 1 wherein discharging means having the finction of self-discharging the battery cell is connected to said battery cell.

3. The battery pack according to claim 1 wherein there is connected to said battery cell alarming means for communicating to outside the occurrence of leakage of the electrolyte solution in said battery cell.

4. The battery pack according to claim 3 wherein said alanning mens is an alarm sound emitting device for emitting an alarm sound to outside.

5. The battery pack according to claim 3 wherein said alarming mens is a light emitting device for emitting light to outside.

* * * * *

UNITED STATES PATENT AND TRADEMARK OFFICE
CERTIFICATE OF CORRECTION

PATENT NO. : 6,337,559 B1  
DATED : January 8, 2002  
INVENTOR(S) : Bunya Sato

Page 1 of 1

It is certified that error appears in the above-identified patent and that said Letters Patent is hereby corrected as shown below:

Column 10,  
Line 32, replace "finction" with -- function --.  
Line 39, replace "alanning" with -- alarming -- and replace " mens" with -- means --.  
Line 42, replace "mens" with -- means --.

Signed and Sealed this

Twenty-third Day of April, 2002

Attest:

Attesting Officer

JAMES E. ROGAN  
Director of the United States Patent and Trademark Office